May 24, 1932.  C. W. METZGER  1,859,978
ROTARY DRILL
Filed March 11, 1927

INVENTOR:
Claude W. Metzger,
BY
ATTORNEYS.

Patented May 24, 1932

1,859,978

UNITED STATES PATENT OFFICE

CLAUDE W. METZGER, OF LOS ANGELES, CALIFORNIA, ASSIGNOR TO HAYNES STELLITE COMPANY, A CORPORATION OF INDIANA

ROTARY DRILL

Application filed March 11, 1927. Serial No. 174,544.

This invention relates to rotary drills, and particularly to oil well and similar drills comprising one or more disk-shaped cutters or bits rotatably mounted in a substantially upright position on a head that is rotatable about its longitudinal axis. More specifically, this invention relates to an improved separately manufactured bit in the form of a ring adapted to be welded to the periphery of a worn disk, as a replacement of virgin metal.

During the drilling operation, the outer periphery of the usual disk drill bit wears away and soon becomes unserviceable because it fails to cut the hole to the required size, and as rapidly and economically as circumstances demand. It has been the practice to renew the worn portions of such bits by building up new edges thereon; for example, by fusion welding thereon metal from a steel welding rod until the bit is again of the required diameter and shape to function as a drilling tool. This procedure is objectionable because steel, alloy steels, or iron added by welding in the manner described have not the cutting efficiency or wearing qualities of new steel hammered, rolled or otherwise worked and properly heat treated.

The principal object of this invention is to provide improved means whereby such disk bits may be kept at high cutting efficiency. To this end, metal that is inherently of greater hardness and more wear-resistant than steel is applied to the working part of the bit which is subject to wear. The particular metal used for the cutting tip is a non-ferrous metal alloy, such as those described in the patents to Edward Haynes, Nos. 873,745, 1,057,423, 1,057,828 and 1,150,113, which is preferably applied to a separately formed steel ring that is welded onto the periphery of a worn disk bit.

The objects and novel features of this invention will became apparent from the following description taken with the accompanying drawings, in which Fig. 1 is a view of a rotary drill embodying his invention;

Figure 2:
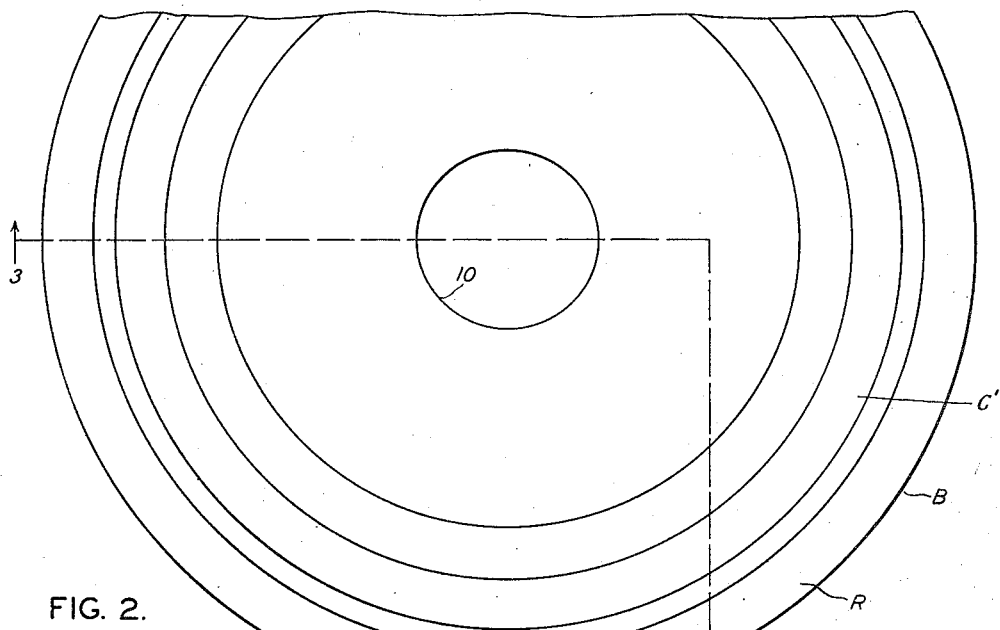
Fig. 2 is a face view of a disk bit embodying this invention.
Figure 3:
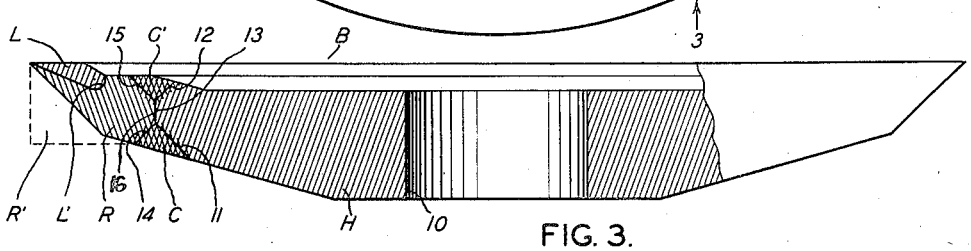
Fig. 3 is a transverse section of the improved bit, taken on the line 3—3 of Fig. 2.

When the cutting edge of a steel disk has become worn, a new and superior cutting tip may be applied thereto according to this invention by first machining off the worn periphery to form a hub portion H having inclined bevelled faces 11 and 12 which may meet in an intermediate edge or may be separated by a surface 13 as shown. The improved renewable tip, which is separately formed, is then fusion welded to the outer periphery of the hub along the surfaces 11, 12 and 13. As usual, the hub portion of the disk may have a central opening 10 to receive a bearing pin or other means for rotatably mounting the same on a suitable drill head or disk supporting body D.

As shown, the improved tip comprises a ring R of steel, alloy steel or the like having inclined faces 14, 15 and 16 coextensive with its inner edge and cooperating with the bevelled faces 11 and 12 and the surface 13 to provide V-shape grooves to receive weld metal C, C' such as steel or alloy steel, whereby the tip is welded to the steel hub H.

However, before the ring R is welded to the hub, and even before it is ground or otherwise formed to match the periphery of the hub, a lip L of wear-resistant metal is welded to its working edge. The ring blank may at first be of rectangular cross-section, as roughly indicated by dotted lines R' and desirably has an annular recess or channel L' formed in one face to receive the lip L. The channel L' may be inclined inwardly to provide a deeper inner portion to receive a thicker section of the lip, the outer edge of the channel and the lip therein being coextensive with the circular periphery of the forward corner of the ring.

The metal forming the lip L is inherently of a higher degree of hardness and more wear-resistant than the steel ring, and preferably consists of a non-ferrous metal alloy containing principally cobalt and one or more metals of the chromium group. The lip L is preferably applied by first welding a thin layer of the non-ferrous alloy onto the bottom of the channel L' to "tin" this surface of the steel ring. This may be accomplished by fusing the non-ferrous alloy rod into the channel by means of a gas flame or an electric arc, with the addition of suitable flux to clean the steel. An oxy-acetylene flame carrying an excess of acetylene is the preferable heating means because it keeps a blanket of reducing gases over the metal that is being welded and prevents overheating and oxidation thereof, as well as the formation of blowholes therein. While the first coating of the non-ferrous metal alloys somewhat with the steel of the ring, subsequent addition of fused non-ferrous metal will weld directly and more readily to the first non-ferrous metal coating and provide a working lip of pure non-ferrous alloy that is much more resistant to wear than steel, alloy steels and the like, and has the property of retaining its hardness and a sharp cutting edge under the most severe service conditions.

The improved disk bit has an important advantage over those heretofore used, in that it is self-sharpening. As wear or abrasion occurs along the outer periphery of the bit, the steel ring R wears away faster than the harder non-ferrous metal lip L, thereby maintaining a sharp wear-resistant cutting edge of the non-ferrous metal at the outer periphery of the bit.

After the wear-resistant lip L has been completely applied to the ring by fusion welding with an oxy-acetylene flame, electric arc, or the like, the faces of the tip or combined ring and lip may be ground or machined to a shape matching the finished hub to form a bit having a dished front face and a convex rear face, for example. The inner edge of the ring is also finished with beveled surfaces to match those on the outer periphery of the hub to provide V-grooves to receive the weld metal that joins the tip to the hub. The ring thus carries the lip independently of the hub and away from the welded joint between the hub and ring, so that a worn tip may readily be removed from the hub by cutting along the welded joint with a gas flame. For convenience in renewing worn disk bits in the oil fields, the improved tips are desirably manufactured in a factory or shop equipped with means to properly deposit the non-ferrous alloy onto the ring, and to accurately machine the tip. Such tips are then supplied to users in various sizes as replacement tips to be welded in the field onto properly machined hubs from which the worn tips have been cut.

Figure 1:
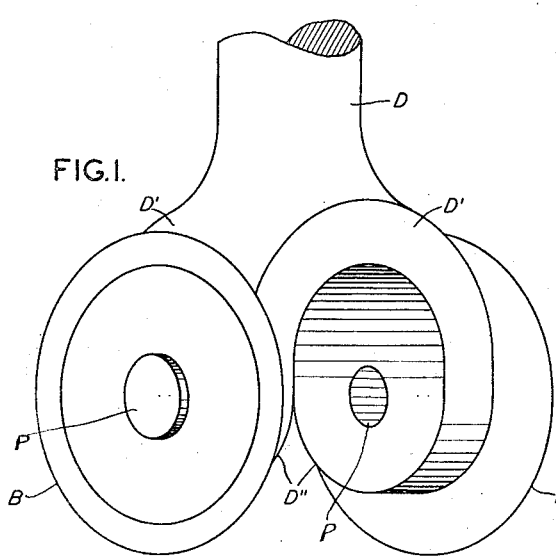

As shown in Fig. 1, the improved disk bits may be rotatably mounted in the usual manner on horizontal pins P fixed in the legs D', D' at the lower end of the head D that is rotatable about the vertical axis of the well. In order to reduce wear of these legs, their lower ends may have deposits of the non-ferrous alloy or similar wear-resistant metal welded thereto, as indicated at D'', D''.

With the improved bit, a given depth of hole can be drilled in considerably less time than formerly, the hole produced is more nearly straight in the direction desired and more satisfactory as to its gage or size, and roundness. Furthermore, less power is required to rotate a drill carrying the improved self-sharpening bits, and since a sharper tool does not tend to move off the drilling axis as a blunt tool does, there is less strain on the drill pipe, casing and other equipment used in drilling. Moreover, the use of the improved disk bit effects a considerable saving of tool, equipment and labor costs, and more rapid drilling is possible because fewer trips are required into and out of the well to change or renew tools.

While the invention is particularly applicable to disk bits for well drilling equipment, certain features of this invention are of more general utility, and it is therefore to be understood that the invention, in its broader aspect, is not limited to the exact embodiment shown and described.

What is claimed is:

1. A ring-shaped tip adapted to be welded to the hub of a drill bit, such tip comprising a metal ring having a deposit of non-ferrous metal forming a lip on its working edge portion, said metal deposit being more resistant to wear than the body of said ring.

2. A ring-shaped tip comprising a metal ring beveled along its inner edge whereby the same is adapted to be welded to the outer edge of a drill bit hub, an annular recess in its front face, the outer edge of said recess being co-extensive with the outer edge of said ring, and a deposit of metal in said recess forming a lip, said metal deposit being more resistant to wear than said ring.

3. A unitary separately-formed bit adapted for use in renewing the worn cutting edge of a tool having a supporting body of ferrous metal, said bit comprising a member of ferrous metal having both a working edge portion and a portion adapted to be welded to said supporting body; and a cutting lip coextensive with said working edge portion, said lip comprising non-ferrous metal welded to said working edge portion and being more resistant to wear than said member whereby the working edge portion of said ferrous metal body wears more rapidly than said lip and makes the bit self-sharpening.

4. A unitary separately-formed bit adapted for use in renewing the worn cutting edge of a tool having a supporting body of ferrous metal, said bit comprising a member of ferrous metal having a channel adjacent and coextensive with its working edge portion and having a portion adapted to be welded to said supporting body; and a cutting lip coextensive with said working edge portion, said lip comprising a deposit of non-ferrous metal in said channel and fused to the bottom and sides thereof, said deposit being more resistant to wear than said member whereby the working edge portion of said ferrous metal body wears more rapidly than said lip and makes the bit self-sharpening.

In testimony whereof I affix my signature.

CLAUDE W. METZGER.